United States Patent
Nagai

(10) Patent No.: US 10,055,658 B2
(45) Date of Patent: Aug. 21, 2018

(54) STATE MONITORING DEVICE

(71) Applicant: DENSO CORPORATION, Kariya, Aichi-pref. (JP)

(72) Inventor: Fumiya Nagai, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 131 days.

(21) Appl. No.: 15/030,546

(22) PCT Filed: Sep. 2, 2014

(86) PCT No.: PCT/JP2014/004487
§ 371 (c)(1),
(2) Date: Apr. 19, 2016

(87) PCT Pub. No.: WO2015/059856
PCT Pub. Date: Apr. 30, 2015

(65) Prior Publication Data
US 2016/0239715 A1    Aug. 18, 2016

(30) Foreign Application Priority Data

Oct. 23, 2013    (JP) .................... 2013-220228

(51) Int. Cl.
*G06K 9/00*    (2006.01)
*B60Q 3/80*    (2017.01)
(Continued)

(52) U.S. Cl.
CPC .......... *G06K 9/00845* (2013.01); *B60K 28/00* (2013.01); *B60Q 3/80* (2017.02);
(Continued)

(58) Field of Classification Search
CPC .... G06K 9/00845; G06K 9/2027; B60Q 3/80; B60K 28/00; G08B 21/06; G08G 1/16
See application file for complete search history.

(56) References Cited

U.S. PATENT DOCUMENTS

| | | | | |
|---|---|---|---|---|
| 4,414,937 A | * | 11/1983 | Ueda ................ | B60K 28/00 123/179.1 |
| 2005/0226472 A1 | * | 10/2005 | Komura ............. | B60R 25/25 382/118 |

(Continued)

FOREIGN PATENT DOCUMENTS

| | | |
|---|---|---|
| JP | H06-243367 A | 9/1994 |
| JP | H06-293228 A | 10/1994 |

(Continued)

OTHER PUBLICATIONS

International Search Report and Written Opinion dated Nov. 25, 2014 in the corresponding International Application No. PCT/JP2014/004487.

*Primary Examiner* — Thai Tran
*Assistant Examiner* — Christopher T Braniff
(74) *Attorney, Agent, or Firm* — Knobbe, Martens, Olson & Bear, LLP

(57) ABSTRACT

A state monitoring device mounted in a vehicle includes: a light emitter to emit light to irradiate a predetermined area; an imaging unit to image an imaging area including the predetermined area; a state monitoring unit to monitor a state of the driver based on an image generated by the imaging unit; a state determination unit to determine whether the driver is ready to drive the vehicle or unready to drive the vehicle; and a light emission control unit to execute specific processing to lower a light emitting function of the light emitter when the state determination unit determines that the driver is unready to drive the vehicle, specific processing to lower a light emitting function of the light emitter and not to lower the light emitting function of the light emitter when the state determination unit determines that the driver is ready to drive the vehicle.

8 Claims, 6 Drawing Sheets

(51) Int. Cl.
*B60K 28/00* (2006.01)
*G06K 9/20* (2006.01)
*G08B 21/06* (2006.01)
*G08G 1/16* (2006.01)

(52) U.S. Cl.
CPC .......... *G06K 9/2027* (2013.01); *G08B 21/06* (2013.01); *G08G 1/16* (2013.01)

(56) References Cited

U.S. PATENT DOCUMENTS

| | | | |
|---|---|---|---|
| 2006/0212202 A1 | 9/2006 | Ota | |
| 2012/0150387 A1* | 6/2012 | Watson | A61B 5/0077 701/36 |
| 2013/0252785 A1 | 9/2013 | Kinoshita et al. | |

FOREIGN PATENT DOCUMENTS

| | | |
|---|---|---|
| JP | 3651571 B2 | 5/2005 |
| JP | 2006-248363 A | 9/2006 |
| JP | 2012-224254 A | 11/2012 |
| WO | 2015059856 A1 | 4/2015 |

* cited by examiner

STATE MONITORING DEVICE

CROSS REFERENCE TO RELATED APPLICATION

This application is based on Japanese Patent Application No. 2013-220228 filed on Oct. 23, 2013, the disclosure of which is incorporated herein by reference.

TECHNICAL FIELD

The present disclosure relates to a state monitoring device for monitoring a state of an automobile driver.

BACKGROUND ART

A state monitoring device (so-called a driver state monitor) for monitoring the state of an automobile driver to realize safe traveling of the automobile has been known, and such a state monitoring device includes a light emitter, a camera, and a controller (see, for example, patent literature 1).

In the state monitoring device, the light emitter emits light including near-infrared light to irradiate a predetermined area where the face of a driver is positioned. The camera generates an image of an imaging area which is an area including the predetermined area. The controller monitors the state of the driver by performing image processing on the image generated by the camera.

The controller included in the state monitoring device disclosed in patent literature 1 prohibits light emission when the engine of the automobile is stopped or idling.

The inventor of the present application conceived that when a driver seated on the driver seat immediately starts driving, it is preferable to monitor whether the driver is in a state suitable for driving, even when the engine of the automobile is stopped or idling. The inventor of the present application arrived at an idea that when the driver immediately starts driving, the state monitoring device makes a light emitter emit the light and monitors the state of the driver even when the engine of the automobile is stopped or idling.

The state monitoring device disclosed in patent literature 1, however, prohibits light emission of the light emitter when the engine is stopped or idling, so that it is not possible to conduct state monitoring by making the light emitter emit the light at required timing.

PRIOR ART LITERATURES

Patent Literature

Patent Literature 1: Japanese Patent No. 3651571

SUMMARY OF INVENTION

In view of the foregoing, it is an object of the present disclosure to provide a state monitoring device which emits light at appropriate timing.

A state monitoring device in an example of the present disclosure is mounted in a vehicle and comprises a light emitter, a camera, a state monitoring unit, a state determination unit, and a light emission control unit.

The light emitter emits light to irradiate an area predetermined as an area where a vehicle driver face is positioned. The camera images an imaging area including the predetermined area.

The state monitoring unit monitors a state of the driver based on a result of image processing on an image generated by the camera. The state determination unit determines whether the driver is unready to drive the vehicle (also referred to as a driving waiting condition) or ready to drive the vehicle (also referred to as a drivable condition).

When the state determination unit determines that the driver is unready to drive the vehicle, the light emission control unit executes specific processing to lower a light emitting function of the unit. When the state determination unit determines that the driver is ready to drive the vehicle, the light emission control unit makes the unit emit the light without lowering the light emitting function of the unit.

In this state monitoring device, when the driver is unready to drive the vehicle, the light emitting function of the light emitter can be lowered. When the driver is ready to drive the vehicle, the state monitoring device of the present disclosure, without lowering the light emitting function of the light emitter, allows the light emitter to emit light.

Therefore, the state monitoring device of the present disclosure can emit the light at appropriate timing while inhibiting light emission at inappropriate timing.

As a result, the state monitoring device of the present disclosure can save the power consumption.

EMBODIMENTS FOR CARRYING OUT INVENTION

Embodiments of the present disclosure will be described below with reference to drawings.

<State Monitoring Device>

Figure 1:
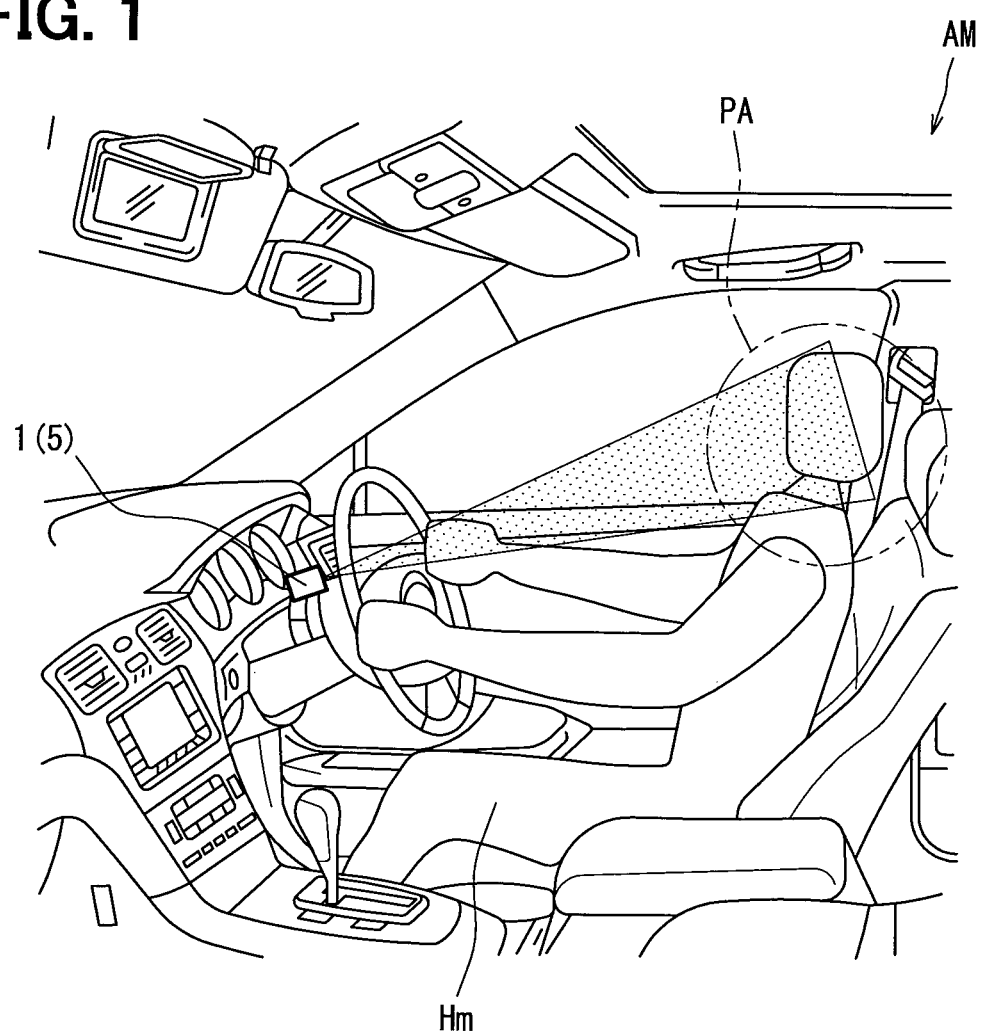
FIG. 1 is a diagram illustrating an installation position of a state monitoring device according to an embodiment of the present disclosure.

A state monitoring device 1 shown in FIG. 1 is a driver monitoring system mounted in an automobile AM to realize safe traveling of the automobile AM or a pleasant driving environment for an occupant of the automobile. The state monitoring device 1 monitors the state of an occupant (i.e., a driver in the case of the present embodiment) Hm of the automobile AM based on images of the occupant Hm including his/her head part.

Figure 2:
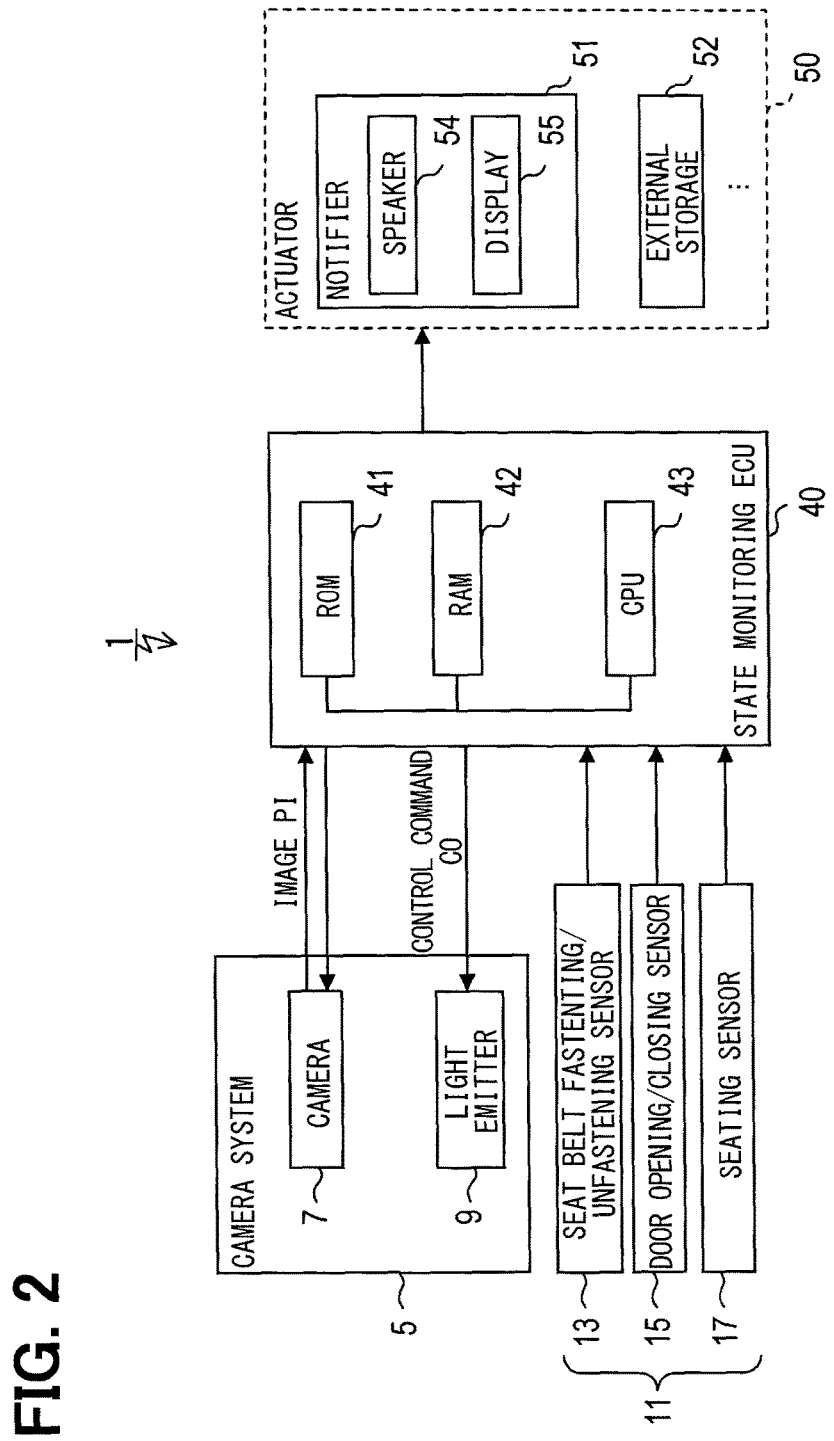
FIG. 2 is a block diagram illustrating a schematic configuration of the state monitoring device.

The state monitoring device 1 includes, as shown in FIG. 2, a camera system 5 which generates images PI and a state monitoring ECU (Electronic Control Unit) 40 which executes image recognition processing on images PI to monitor the state of the occupant Hm. Furthermore, the state monitoring device 1 is coupled with a group of sensors 11 for detecting various conditions of the automobile AM and an actuator 50 including various devices mounted in the automobile AM.

The camera system 5 including a camera 7 and a light emitter 9 emits light (hereinafter referred to as "illumination light") whose wavelength ranges over, at least, a near-infrared region and generates images PI. The camera system 5 is mounted in an installation position which is predetermined so that the imaging area covers an automobile interior space where the head part of the occupant Hm of the automobile AM is likely to be positioned (hereinafter referred to as the "predetermined area PA" (see FIG. 1)). The predetermined area PA in the present embodiment is an area which includes an elliptical area where the eyes of a driver in a normal driving posture exist (i.e., eyelips).

The camera system 5 is conceivably mounted, for example, above the steering column.

The light emitter 9 is a light emitting device to emit illumination light in accordance with a control command CO from the state monitoring ECU 40. The light emitter 9 in the present embodiment may be a light emitting diode (LED). The light emitter 9 is mounted so as to irradiate the predetermined area PA with illumination light.

The camera 7 is a well-known camera device including an image pickup device (an image sensor like a so-called CCD or CMOS), an optical lens, an optical filter, an oscillator, an interface circuit, and peripheral electronic circuits including a power supply. In the camera 7, light incident, via an optical filter such as a visible-light cutting filter and an optical lens, on the image pickup device is received by pixels, and images PI showing shadows corresponding to light intensities are generated. The visible-light cutting filter referred to herein is a filter which transmits, at least, light components (e.g. wavelengths in a near-infrared region) that are predetermined as appropriate for image processing by the state monitoring ECU 40, while reducing (cutting) the transmission of light components (e.g. wavelengths in a visible-light region) inappropriate for image processing.

The actuator 50 includes, at least, a notifier 51 and an external storage device 52.

The notifier 51 is mechanism for giving a notification in accordance with a control signal form the state monitoring ECU 40. The notifier 51 includes a speaker 54 and a display 55. The speaker 54 outputs sound. The display 55 displays different kinds of information in different display modes (for example, using a liquid crystal display and indicators).

The external storage device 52 is a rewritable non-volatile storage device (e.g. a hard disk drive and a flash memory).

<Sensor Group>

The sensor group includes, at least, a seat belt fastening/unfastening sensor 13, a door opening/closing sensor 15, and a seating sensor 17.

The seat belt fastening/unfastening sensor 13 is a well-known sensor to detect whether a seat belt is fastened or unfastened (i.e., buckled or unbuckled) at each seat (e.g. a driver seat, a passenger seat) of the automobile AM. The seat belt fastening/unfastening sensor 13 outputs a fastening/unfastening signal indicating whether or not the seat belt is fastened to the state monitoring ECU 40.

The door opening/closing sensor 15 is a well-known sensor to detect whether each door of the automobile AM is open or closed. The door opening/closing sensor 15 outputs an opening/closing signal indicating whether each door is open or closed to the state monitoring ECU 40.

The seating sensor 17 is a well-known sensor to detect whether each seat (e.g. a driver seat, a passenger seat) of the automobile AM is occupied (i.e., seated condition). The seating sensor 17 outputs a seating signal indicating whether each seat is occupied to the state monitoring ECU 40.

The sensor group 11 may be coupled to the state monitoring ECU 40 either directly or via a well-known in-vehicle network.

<State Monitoring ECU 40>

The state monitoring ECU 40 includes, at its main component, a well-known microcomputer with, at least, a ROM 41, a RAM 42, and a CPU 43.

The ROM 41 is a storage device which stores data and programs to be retained even with power supply cut off. The RAM 42 is a memory to temporarily store data. The CPU 43 is a processing unit to execute processing in accordance with programs stored in the ROM 41 or RAM 42.

The ROM 41 stores a program which enables the CPU 43 to execute a state monitoring process to control the actuator 50 for realizing safe traveling of the automobile AM when it is determined that safety of the occupant Hm for driving the automobile AM is low based on a result of monitoring the state of the occupant Hm.

Namely, the state monitoring ECU 40 of the present embodiment controls the camera system 5 and, based on the results of image processing on the image PI generated at the camera 7, monitors the state of the occupant Hm of the automobile AM. Furthermore, the state monitoring ECU 40 controls the actuator 50 based on the results of monitoring the state of the occupant Hm of the automobile AM.

<State Monitoring Process>

Next, the state monitoring process executed by the state monitoring ECU 40 will be described.

After the ignition switch of the automobile AM is turned on, the state monitoring process is started at predetermined intervals.

Figure 3:
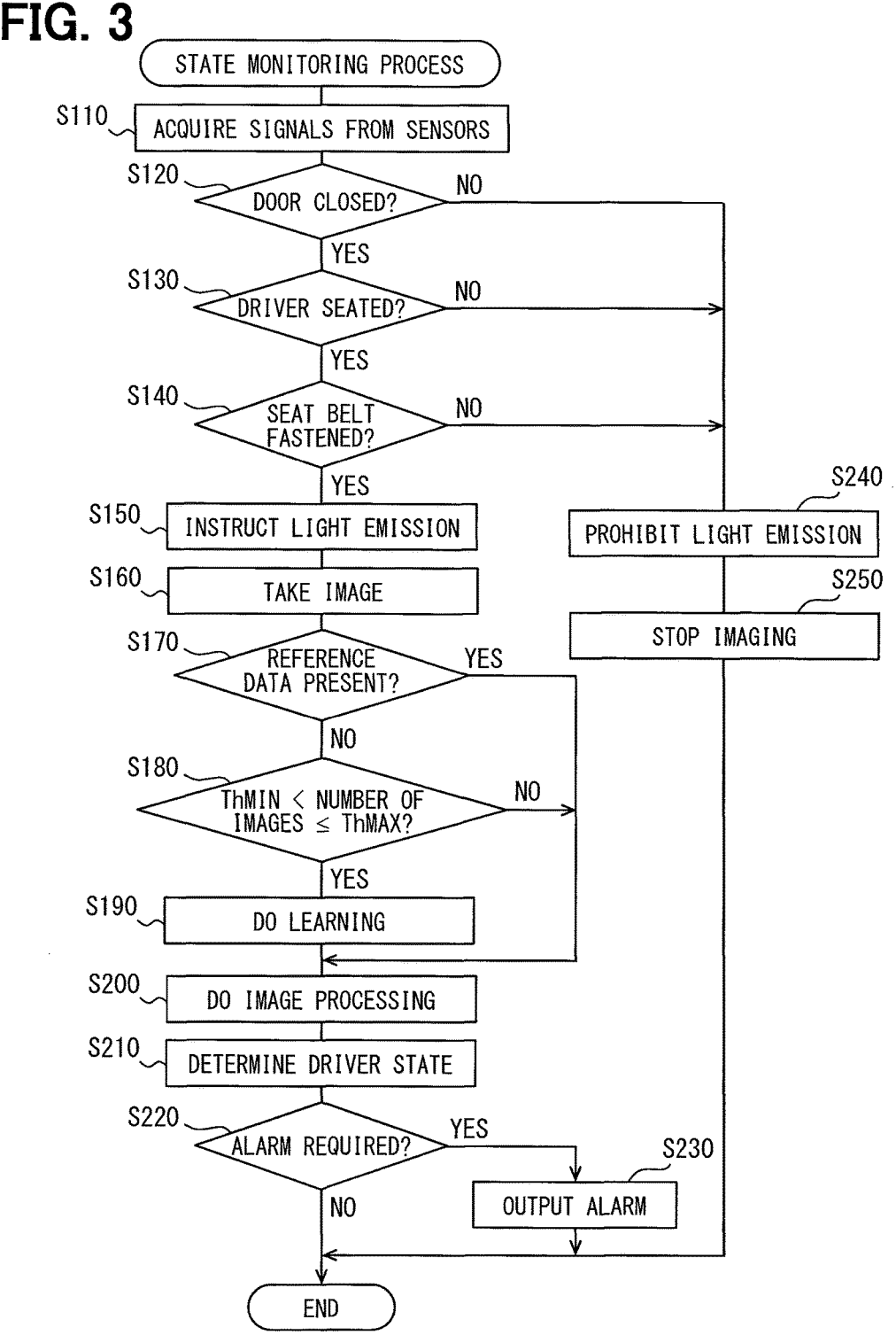
FIG. 3 is a flowchart illustrating a state monitoring process according to an embodiment.

When the state monitoring process is started, first, signals from the sensor group 11 are obtained (S110) as shown in FIG. 3. Specifically, in S110 of the present embodiment, a fastening/unfastening signal is obtained from the seat belt fastening/unfastening sensor 13, an opening/closing signal is obtained from the door opening/closing sensor 15, and a seating signal is obtained from the seating sensor 17.

Subsequently, it is determined whether each door of the automobile AM is open based on the opening/closing signal obtained in S110 from the door opening/closing sensor 15 (S120). When it is determined in S120 that at least one of the doors of the automobile AM is open (S120: NO), the driver Hm cannot immediately start driving the automobile AM, so that preparations for driving the vehicle are determined incomplete (hereinafter referred to as "unready to drive" and "driving waiting condition". As a result, processing advances to S240 being described in detail later.

When it is determined in S120 that all doors of the automobile are closed (S120: YES), it is determined whether the driver seat is occupied based on the seating signal from the seating sensor 17 (S130). When it is determined in S130 that the driver seat is not occupied (S130: NO), it is determined that the driver Hm is unready to drive. As a result, processing advances to S240.

When it is determined in S130 that the driver seat is occupied (S130: YES), it is determined whether the seat belt of the driver seat is fastened based on the fastening/unfastening signal from the seat belt fastening/unfastening sensor 13 (S140). When it is determined in S140 that the seat belt of the driver seat is not fastened (S140: NO), it is determined that the driver Hm is unready to drive. As a result, processing advances to S240.

When the seat belt of the driver seat is fastened (S140: YES), it is determined that driving preparations have been completed (hereinafter referred to as "ready to drive" and "drivable condition") allowing the driver Hm to immediately start driving the automobile AM and a control command CO is outputted to the light emitter 9 (S150). When the control command CO is received, the light emitter 9 emits illumination light to irradiate the predetermined area PA.

Subsequently, an imaging command is outputted to the camera 7 (S160). When the imaging command is received, the camera 7 generates an image PI and outputs the image PI to the state monitoring ECU 40. The state monitoring ECU 40 stores the image PI in the RAM 42.

In the present embodiment, the timing of illumination light emission by the light emitter 9 and the timing of imaging an image PI by the camera 7 are determined such that the period of illumination light emission by the light emitter 9 and the period of exposure of the camera 7 are synchronized. The synchronization in this case may refer to complete coincidence between the duration of emission by the light emitter 9 and the duration of exposure of the camera 7, but it may be preferable that the emission period is slightly longer than the exposure period. This is because, in the case of imaging in the interior of an automobile, raising the S/N ratio is effective in order that image quality deterioration due to disturbance noise light generated by the sunlight is prevented.

Furthermore, in the state monitoring process, it is determined whether reference data used to monitor the state of the driver Hm has been generated already (S170). When it is determined in S170 that the reference data has been generated already (S170: YES), processing advances to S200 being described in detail later.

When it is determined in S170 that the reference data has not been generated yet (S170: NO), it is determined whether the number of images PI generated in S160 is larger than a lower threshold Thmin without exceeding an upper threshold Thmax (S180). When it is determined in S180 that the number of images PI generated in S160 is larger than the lower threshold Thmin without exceeding the upper threshold Thmax (S180: YES), a well-known learning process is executed (S190) based on the images PI accumulated in the RAM 42.

In the learning process in this case, feature points of the driver's facial skeleton and feature points of the driver's eyes, nose, and mouth are extracted from the images PI accumulated in the RAM 42, and skeletal data representing such feature points and positional relationships between such feature points is generated. Furthermore, in the learning process, comparison target data is generated based on the images PI accumulated in the RAM 42. The comparison target data represents degrees of eye opening of the driver Hm when the driver Hm is considered to be wake and the driver's facing directions and line-of-sight directions when the driver Hm is considered to be watch in the travel direction of the automobile Hm. Note that such skeletal data and comparison target data only represents reference data examples. The skeletal data and comparison target data may be generated, for example, by arithmetically averaging the feature points, eye-opening degrees, facing directions, and line-of-sight directions based on the images PI accumulated in the RAM 42.

In the state monitoring process, when the learning process is ended, processing advances to S200.

When it is determined in S180 that the number of images PI generated in S160 is not larger than the lower threshold Thmin or is larger than the upper threshold Thmax (S180: NO), processing advances to S200 skipping S190 of the learning process.

In S200, well-known image processing for deriving the degree of eye opening of the driver Hm and well-known image processing for detecting the facing direction and line-of-sight direction of the driver Hm are executed based on the images PI generated in S160. Subsequently, based on the results of image processing executed in S200, the state of the driver Hm is determined (S210).

The driver state determination executed in S210 is well-known processing for determining the degree of awakeness of the driver Hm and whether the driver Hm is attentively driving looking at the road. In determining the driver's state in the present embodiment, the degree of driver's awakeness may be derived, for example, by matching the eye-opening degree derived in S200 against the eye-opening degrees included in the comparison target data. Also, in determining the driver's state in the present embodiment, it may be determined whether the driver is attentively driving, for example, by matching the facing direction and line-of-sight direction of the driver Hm derived in S200 against the facing directions and line-of-sight directions included in the comparison target data.

Specifically, in the present embodiment, when a state in which the driver's facing direction or line-of-sight direction is not a forward direction lasts a predetermined period of time, the driver may be determined as inattentively driving. Note, however, that whether the driver is attentively driving may be determined in an alternative manner. For example, it may be determined taking into consideration information obtained from a periphery monitoring device mounted in the automobile AM and automobile speed information. This is to make sure whether the driver Hm is inattentively driving or is looking around for safety confirmation to secure safe traveling of the automobile AM.

Subsequently, based on the result of driver state determination in S210, it is determined whether to output an alarm to the occupant Hm (S220). In S220 in the present embodiment, for example, when the degree of awakeness of the driver Hm is lower than a predetermined threshold (i.e. when the driver Hm is determined to be sleepy beyond a certain degree) or when the driver Hm is inattentively driving, it is determined that the safety of the occupant Hm for driving the automobile AM is low and that outputting an alarm is necessary.

When it is determined in S220 that an alarm output is necessary (S220: YES), a control signal is outputted to the actuator 50 to have an alarm outputted (S230).

The alarm outputted in S220, for example, when the awakeness degree of the driver Hm is lower than the predetermined threshold includes, for example, outputting a notification from the notifier 51 to urge the driver Hm to have a rest, and storing, in the external storage device 52, information about the time when and the location where the awakeness degree of the driver Hm fell below the predetermined threshold.

Subsequently, the state monitoring process is ended, and the timing of next start is awaited.

When it is determined in S220 that no alarm is required (S220: NO), the state monitoring process is ended without executing S230, and the timing of next start is awaited.

When it is determined in S120 that at least one of the doors of the automobile AM is open (S120: NO), processing advances to S240 in which specific processing is executed to lower the emission function of the light emitter 9. Specifically, in S240 in the present embodiment, the specific processing is executed to prohibit outputting a control command CO to the light emitter 9.

Note that S240 is also entered when it is determined in S130 that the driver is not seated on the driver seat (S130: YES) and when it is determined in S140 that the seat belt of the driver seat is not fastened (S140: NO).

Subsequently, outputting of an imaging command to the camera 7 is stopped (S250). After S250, the state monitoring process is ended and the timing of next start is awaited.

Figure 4:
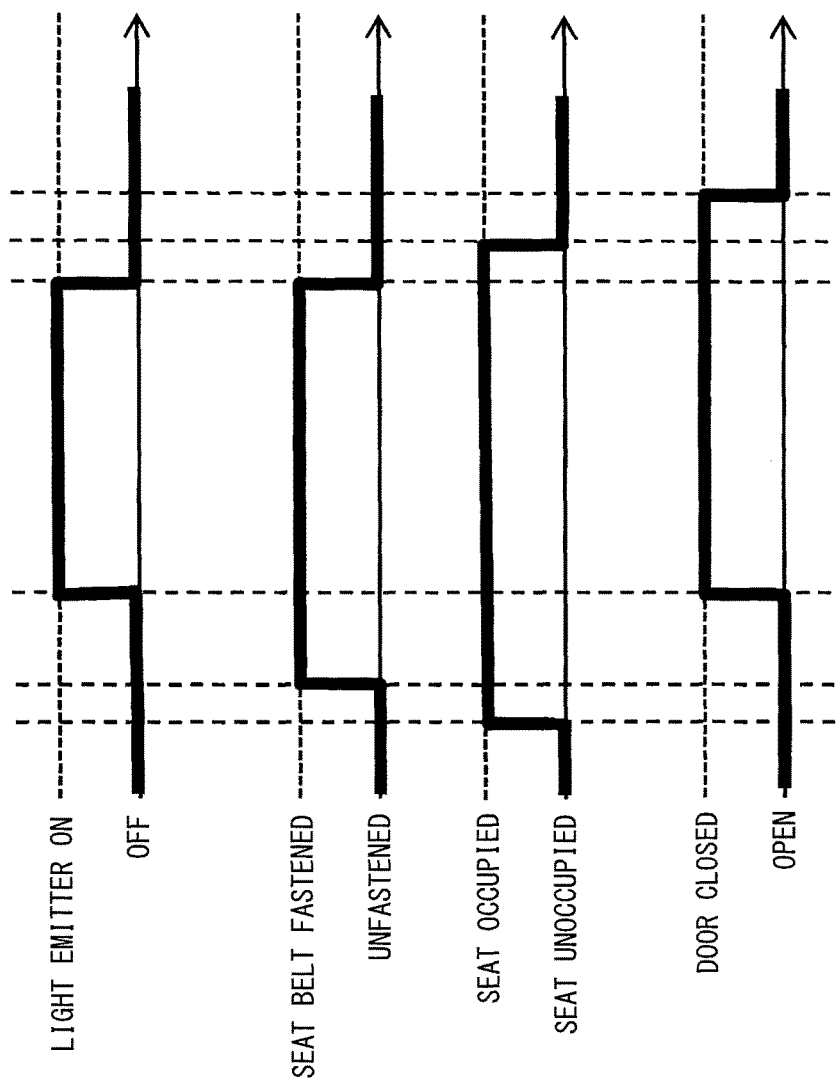
FIG. 4 is a timing chart illustrating timing of light emission by a light emitter.

As described above, in the state monitoring process of the present embodiment, when, as shown in FIG. 4, all doors of the automobile AM are closed, the driver is seated on the driver seat and the seat belt of the driver seat is fastened, it is determined that the driver Hm is ready to drive and the light emitter 9 emits illumination light (lights up) to irradiate the predetermined area PA. Further, in the state monitoring process, the state of the driver is monitored based on the results of image processing on the images PI generated at the camera 7 during the time the illumination light is emitted.

In the state monitoring process, when at least one of the doors of the automobile AM is closed or when the driver is not seated on the driver seat or when the seat belt of the driver seat is not fastened, it is determined that the driver Hm is unready to drive and the light emitter 9 is prohibited from emitting light. In this case, generation of images PI by the camera 7 is stopped.

Advantage of Embodiment

As described above, when the driver Hm has not fastened the seat belt or when any door of the automobile AM is open or when the driver Hm is not seated on the driver seat, the possibility of the driver Hm immediately starting driving the automobile AM is low.

Hence, when a fastening/unfastening signal indicates that the seat belt of the driver seat is not fastened or when an opening/closing signal indicates that at least a door is open or when a seating signal indicates that the driver is not seated on the driver seat, the state monitoring device 1 determines that the driver Hm is unready to drive.

When the driver Hm in unready to drive, the state monitoring device 1 can stop the emission of light by the light emitter 9.

In the state monitoring device 1 described above, light emission by the light emitter 9 can be prevented under an illumination-unneeded condition. Thus, the state monitoring device 1 can reduce power consumption by the light emitter 9 and can also reduce the possibility of the driver feeling uncomfortable due to unnecessary light emission.

When all doors of the automobile AM are closed, the driver is seated on the driver seat, and the seat belt of the driver seat is fastened, the state monitoring device 1 determines that driving can be started.

Thus, in the state monitoring device 1, it can be reliably determined whether the driver Hm is unready to drive or ready to drive.

Also, in the state monitoring device 1, when the driver Hm is ready to drive, light emission by the light emitter 9 is not stopped and the predetermined area PA can be irradiated with illumination light.

Namely, in the state monitoring device 1, light can be emitted at appropriate timing while light emission is inhibited when not required.

In the state monitoring device 1, even when the engine is stopped or idling, the light emitter 9 can emit illumination light to irradiate the predetermined area as long as the driver Hm is ready to drive. Therefore, in the state monitoring device 1, even when the engine is stopped or idling, images PI clearly representing the face of the driver Hm can be generated and, based on the generated images PI, reference data can be generated.

Therefore, in the state monitoring device 1 compared with existing techniques, the time required to generate reference data after the ignition switch is turned on can be reduced, so that monitoring the state of the driver Hm can be started soon after the driver Hm enters the automobile AM.

Other Embodiments

Although embodiments of the present disclosure have been illustrated above, embodiments of the present disclosure are not limited to those illustrated above and cover various forms of embodiments.

For example, in S240 of the state monitoring process of the above embodiment, the specific processing is executed to prohibit outputting a control command CO to the light emitter 9. However, the specific processing may be executed in S240 for an alternative purpose. For example, the specific processing may be executed to reduce the intensity of emission by the light emitter 9.

In such a case, the state monitoring device can reduce the intensity of emission by the light emitter 9, thereby reducing the power consumption by the light emitter 9.

Figure 5:
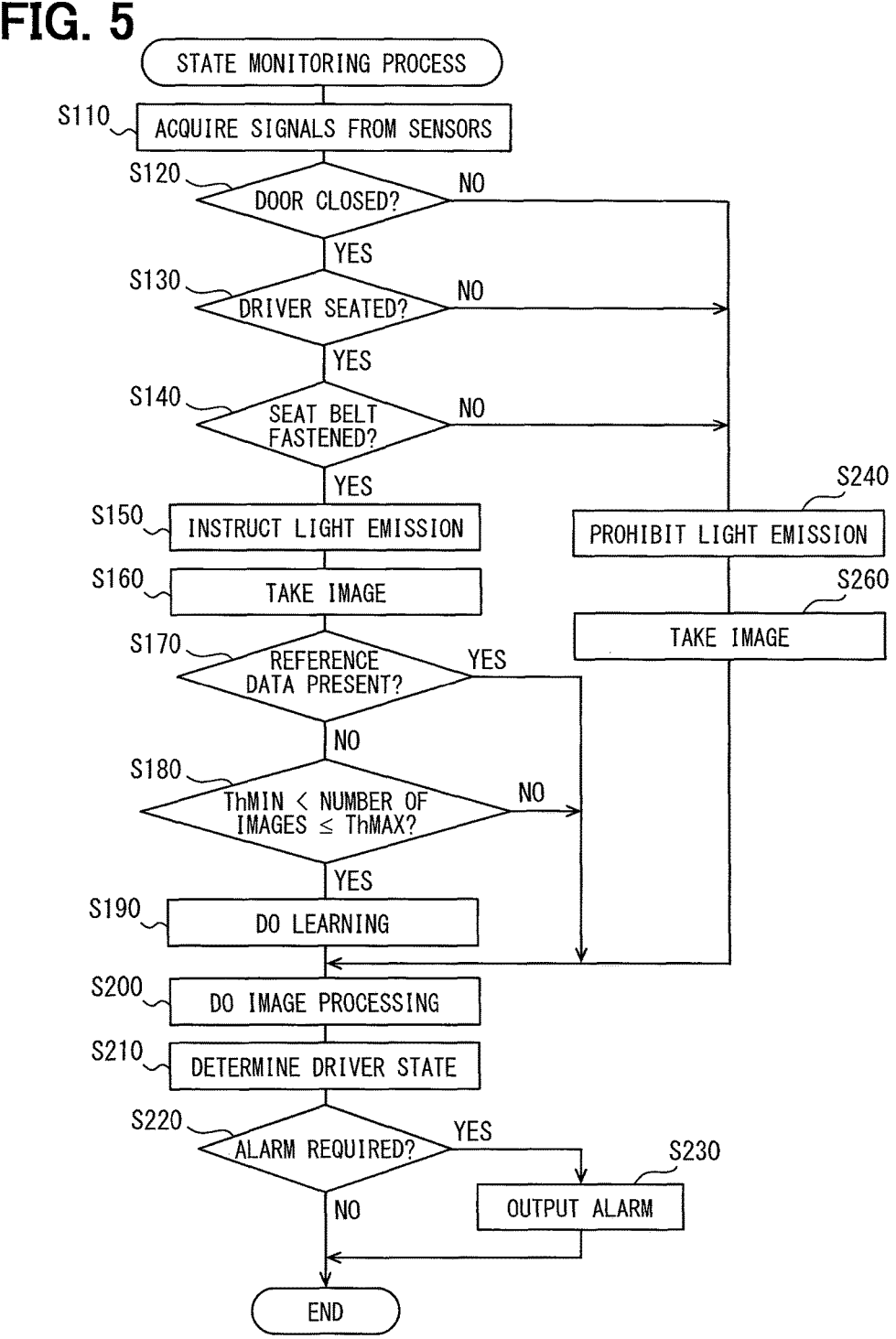
FIG. 5 is a flowchart illustrating a state monitoring process according to a modification example.

In the state monitoring process in the above embodiment, when the automobile AM is not ready for driving (S120: NO, S130: NO, S140: NO), light emission by the light emitter 9 is prohibited (S240) and generation of images PI by the camera 7 is stopped (S250). However, as shown in FIG. 5, the state monitoring process may be executed in an alternative manner such that, when the automobile AM is not ready for driving (S120: NO, S130: NO, S140: NO), light emission by the light emitter 9 is prohibited (S240) whereas images PI are generated at the camera 7 (S260).

In this case, the images PI generated in S260 are unshaded, but, in the state monitoring process, image processing on the unshaded images may be performed (S200) and, based on the results of image processing on the unshaded images, the state of the driver may be determined (S210).

Figure 6:
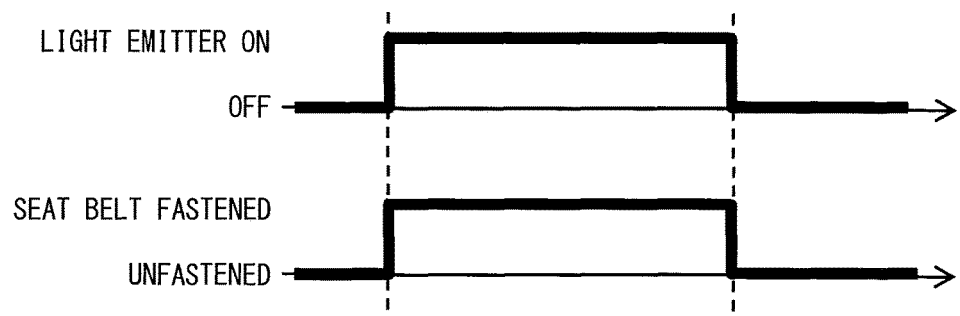
FIG. 6 is a timing chart illustrating a modification example of timing of light emission by a light emitter.

In the above embodiment, the period of time during which the light emitter 9 emits illumination light to irradiate the predetermined area PA is a period of time during which all doors of the automobile AM closed, the driver seated on the driver seat and the seat belt of the driver seat fastened. However, the period during which illumination light is emitted not limited to the above example. For example, the period during which illumination light is emitted may be, as shown in FIG. 6, a period during which the seat belt of the driver seat fastened without taking other conditions into consideration.

Of the three conditions that define the period of illumination light emission in the foregoing first embodiment, i.e. all doors closed, the driver seated on the driver seat, and the seat belt of the driver seat fastened, one or two may be omitted or an additional condition may be included.

An example of such an additional condition for prohibiting illumination light emission from the light emitter 9 may be a shift lever not in any drive position as indicated by a position signal from a shift position sensor. In this case, the state monitoring device 1 is required to be coupled with the shift position sensor to detect the shift lever position of the automobile AM. The shift position sensor is a well-known sensor which can output a shift position signal to the state monitoring ECU 40.

When the drive is ready to drive, the light emitter 9 may continuously emit light or may emit light pulsed in synchronization with the timing of generation of images PI. In the latter case, the light emitter 9 does not unnecessarily emit light, so that the power consumption of the light emitter 9 can be reduced.

In the foregoing embodiment: the state monitoring ECU 40 that executes S200 and S210 represents an example of a state monitoring unit and a state monitoring means; the state monitoring ECU 40 that executes S120 to S140 represents an example of a state determination unit and a state determination means; the state monitoring ECU 40 that executes S150 and S240 represents an example of a light emission control unit and a light emission control means; and the state monitoring ECU 40 that executes S110 represents an example of a fastening/unfastening signal obtaining unit and a fastening/unfastening signal obtaining means, an example of an opening/closing signal obtaining unit and an opening/closing signal obtaining means, and an example of a seating signal obtaining unit and a seating signal obtaining means.

In the present disclosure, a state monitoring device can be provided in various configurations.

For example, a state monitoring device in an example of the present disclosure is mounted in a vehicle and includes a light emitter, a camera, a state monitoring unit, a state determination unit and a light emission control unit.

The light emitter emits light to irradiate a predetermined area. The predetermined area as referred to herein is an area where the vehicle driver's face is positioned. The camera images an area including the predetermined area.

The state monitoring unit monitors the state of the driver based on the results of image processing on the image generated by the camera. The state determination unit determines whether the driver is unready to drive (also referred to as "driving waiting condition") or ready to drive (also referred to as "drivable condition").

When it is determined by the state determination unit that the driver is unready to drive, the light emission control unit executes specific processing to lower a light emitting function of the light emitter. When it is determined that the driver is ready to drive, the light emission control unit, without lowering the light emitting function of the light emitter, allows the light emitter to emit the light.

In the state monitoring device described above, when the driver is unready to drive, the light emitting function of the light emitter can be lowered. When the driver is ready to drive, the state monitoring device of the present disclosure, without lowering the light emitting function of the light emitter, allows the light emitter to emit light.

Namely, in the state monitoring device of the present disclosure, light emission at inappropriate timing can be inhibited, while light can be emitted at appropriate timing.

Thus, in the state monitoring device of the present disclosure, power consumption can be reduced.

In many cases, in image processing executed by a state monitoring unit of a state monitoring device, features of a driver's face extracted from an image generated by a camera are compared with reference data, which is prepared as data representing the features of the driver's face in a normal state.

Such reference data is, in many cases, generated based on an image generated by the camera immediately after the driver enters the automobile.

In the case of the state monitoring device disclosed in patent literature 1, however, light emission is prohibited while the engine is stopped or idling, so that, while the engine is stopped or idling, it is not possible to generate reference data by generating an image.

In view of this, in the foregoing state monitoring device, when it is determined by the state determination unit that the driver is ready to drive, the light emitter can emit light and the camera can generate an image even with the engine stopped or idling.

The above state monitoring device can generate, even with the engine stopped or idling, an image clearly showing the driver's face and can generate reference data based on the image generated with the engine stopped or idling.

This makes it possible to reduce the time required before the reference data is generated and to start monitoring the state of the driver soon after the driver enters the automobile.

The above state monitoring device may include at least one of a fastening/unfastening signal obtaining unit (40, S110) to obtain a fastening/unfastening signal, an opening/closing signal obtaining unit (40, S110) to obtain an opening/closing signal, and a seating signal obtaining unit (40, S110) to obtain a seating signal.

The fastening/unfastening signal as referred to herein is, for example, a signal indicating a state in which a seat belt attached to the automobile is fastened. Also, the opening/closing signal is a signal indicating a door open/closed state of the automobile. The seating signal is a signal indicating whether or not the driver seat is occupied.

Therefore, when the driver has not fastened the seat belt, the possibility of the driver immediately starting driving the automobile is considered low. Also, when any door of the automobile is open, the possibility of the driver immediately starting driving the automobile is considered low. Furthermore, when the driver is not seated on the driver seat, the possibility of the driver immediately starting driving the automobile is considered low.

Therefore, when the fastening/unfastening signal indicates that the seat belt of the driver seat is not fastened or when the opening/closing signal indicates that a door of the automobile is open or when the seating signal indicates that the driver is not seated on the driver seat, the state determination unit may determine that the driver is unready to drive.

In the state monitoring device as described above, whether the driver is unready to drive or ready to drive can be reliably determined.

Embodiments of the present disclosure have been described. When any of the above embodiments is modified by omitting a part of the configuration thereof, it still represents an embodiment of the present disclosure. Also, when any of the above embodiments is appropriately combined with a modification example, the combination represents an embodiment of the present disclosure. Furthermore, when any of the above embodiments is modified in whatever manner without departing from the substance of the present disclosure, it still remains an embodiment of the present disclosure.

The invention claimed is:

1. A state monitoring device mounted in a vehicle, comprising:
    a light emitter that emits light to irradiate an area predetermined as an area where a vehicle driver's face is positioned;
    an imaging unit that generates images of an imaging area including the predetermined area;
    a state monitoring unit that monitors awakeness of the driver based on a result of image processing on an image generated by the imaging unit;
    a state determination unit that determines whether the driver is ready to drive the vehicle or unready to drive the vehicle; and
    a light emission control unit that
        (a) when the state determination unit determines that the driver is unready to drive the vehicle, executes specific processing to lower a light emitting function of the light emitter, and (b) when the state determination unit determines that the driver is ready to drive the vehicle, makes the light emitter emit the light without lowering the light emitting function of the light emitter, wherein:

when the state determination unit determines that the driver is ready to drive the vehicle but becomes unready to drive the vehicle while the state monitoring unit monitors the awakeness of the driver, the light emission control unit lowers the light emitting function of the light emitter and stops image generation by the imaging unit;

when a shift lever position is not a drive position, the state determination unit determines that the driver is unready to drive the vehicle; and when the state determination unit determines that the shift lever position changes from the drive position to a position other than the drive position while the state monitoring unit monitors the awakeness of the driver, the light emission control unit lowers the light emitting function of the light emitter and stops image generation by the imaging unit.

2. The state monitoring device according to claim 1, further comprising:

a fastening/unfastening signal obtaining unit that obtains a fastening/unfastening signal indicating whether a seat belt attached to the vehicle is fastened, wherein when the fastening/unfastening signal obtained by the fastening/unfastening signal obtaining unit indicates that a seat belt of a driver seat is not fastened, the state determination unit determines that the drive is unready to drive the vehicle.

3. The state monitoring device according to claim 1, further comprising:

an opening/closing signal obtaining unit that obtains an opening/closing signal indicating whether a door of the vehicle is open or closed, wherein when the opening/closing signal obtained by the opening/closing signal obtaining unit indicates that the door is open, the state determination unit determines that the drive is unready to drive the vehicle.

4. The state monitoring device according to claim 1, further comprising:

a seating signal obtaining unit that obtains a seating signal indicating whether the driver seat is occupied, wherein when the seating signal obtained by the seating signal obtaining unit indicates that the driver seat is not occupied, the state determination unit determines that that the drive is unready to drive the vehicle.

5. The state monitoring device according to claim 1, wherein in the specific processing, the light emission control unit stops light emission by the light emitter.

6. The state monitoring device according to claim 1, wherein in the specific processing, the light emission control unit reduces intensity of light emission by the light emitter.

7. The state monitoring device according to claim 1, wherein when the state determination unit determines that the driver is ready to drive the vehicle, the light emission control unit makes the light emitter emit the light and the imaging unit generates the image even with the engine stopped or idling.

8. A method for monitoring a state of a driver of a vehicle, comprising:

emitting light to irradiate an area predetermined as an area where the driver's face is positioned;

generating images of an imaging area including the predetermined area;

monitoring awakeness of the driver based on a result of image processing on a generated image;

determining whether the driver is ready to drive the vehicle or unready to drive the vehicle;

executing specific processing to lower a light emitting function of the light emitter, when determining that the driver is unready to drive the vehicle, and emitting the light without lowering the light emitting function of the light emitter, when the state determination unit determines that the driver is ready to drive the vehicle, wherein:

when determining that the driver is ready to drive the vehicle but becomes unready to drive the vehicle while monitoring the awakeness of the driver, the emitting of the light is lowered and the generating of the images is stopped;

when a shift lever position is not a drive position, the driver is determined to be unready to drive the vehicle; and when determining that the shift lever position changes from the drive position to a position other than the drive position while monitoring the awakeness of the driver, the emitting of the light is lowered and the generating of the images is stopped.

* * * * *

UNITED STATES PATENT AND TRADEMARK OFFICE
CERTIFICATE OF CORRECTION

| | |
|---|---|
| PATENT NO. | : 10,055,658 B2 |
| APPLICATION NO. | : 15/030546 |
| DATED | : August 21, 2018 |
| INVENTOR(S) | : Fumiya Nagai |

It is certified that error appears in the above-identified patent and that said Letters Patent is hereby corrected as shown below:

In the Drawings

Sheet 2 of 6 (Reference Numeral 13), (FIG. 2), Line 1, change "FASTENTING/" to --FASTENING/--.

In the Specification

Column 3, Line 9 (approx.), change "eyelips)." to --eyelids).--.

In the Claims

Column 11, Line 32, in Claim 2, change "drive" to --driver--.

Column 11, Line 43, in Claim 3, change "drive is" to --driver is--.

Column 12, Lines 1-2 (approx.), in Claim 4, change "that that" to --that--.

Column 12, Line 2, in Claim 4, change "drive is" to --driver is--.

Signed and Sealed this
Eighth Day of January, 2019

Andrei Iancu
*Director of the United States Patent and Trademark Office*